Oct. 26, 1965

E. N. WESTRUM 3,214,042

WHEEL HANDLING VEHICLE

Filed Oct. 10, 1962

INVENTOR.
Eldon Westrum
BY
Fidler, Beardsley & Bradley
Attys.

Oct. 26, 1965  E. N. WESTRUM  3,214,042
WHEEL HANDLING VEHICLE
Filed Oct. 10, 1962  3 Sheets-Sheet 2

INVENTOR.
Eldon Westrum
BY
Fidler, Beardsley & Bradley
Att'ys.

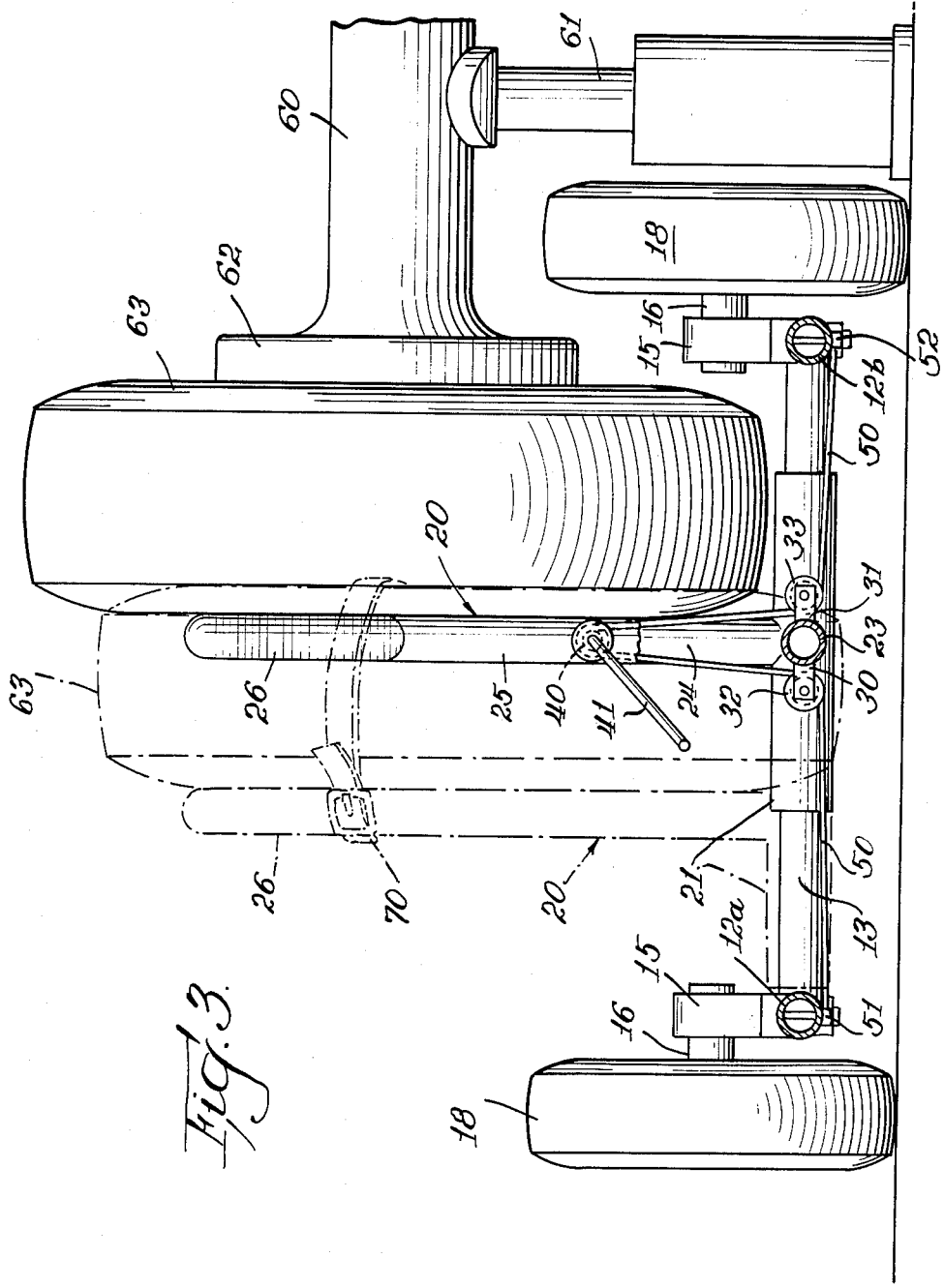

United States Patent Office 3,214,042
Patented Oct. 26, 1965

3,214,042
WHEEL HANDLING VEHICLE
Eldon N. Westrum, Stratford, Iowa
Filed Oct. 10, 1962, Ser. No. 229,707
2 Claims. (Cl. 214—330)

This invention relates to vehicles and has to do particularly with a vehicle having a main frame and load carrying portion adapted to be shifted laterally on the main frame of the vehicle.

The vehicle of the present invention, while not limited to such use, is especially suited to receiving and transporting a tractor tire or tires. It is well known that an off-the-road tractor, such as a farm tractor, often has large tires which are filled with a liquid in order to add weight to the tractor and which tires consequently weigh as much as 800 to 1,000 pounds each. Due to their size and weight, such tires present serious problem when it is found necessary to remove them from the tractor and transport them to a garage or service station for repair. The conventional truck or trailer has its bed sufficiently high above the ground so that it is necessary to lift the tractor tire, after removal from the tractor, to place it on the bed. This is difficult owing to the great weight of the tire when filled with liquid. Obviously, because of the inconvenience and difficulty involved, it is not desirable to remove the liquid from the tire in the field.

While the vehicle of the present invention is shown and described as a trailer, since this is the form which it will usually take, it will be understood that the invention is not limited to trailers but may be embodied in a self-propelled vehicle.

In accordance with the present invention, a vehicle is provided which has a low bed and which has a main frame supporting a laterally slidable load supporting frame or member with means being provided for adjustably positioning the load supporting frame or member transversely or laterally on the main frame. The vehicle bed and the supporting portion of the load supporting frame are sufficiently low so that the tractor axle carrying the defective tire can be jacked up and the trailer moved under the wheel of the tractor, after which the tire is lowered onto the load supporting frame or member and the tire (and rim) is removed from the wheel by sliding the load supporting frame or member a sufficient distance to clear the lug bolts on the tractor wheel. The vehicle can then be moved out from under the tractor axle and can be towed to a repair shop for the needed repairs on the tire.

An object of the invention is to provide a new and improved vehicle.

Another object is to provide a vehicle whereby the load can readily be shifted relatively to the main frame of the vehicle.

Another object is to provide a vehicle having a main frame, an auxiliary, load carrying frame adjustable laterally on the main frame and means for adjustably positioning the auxiliary frame on the main frame.

Another object is to provide a vehicle tire trailer of such construction that it may be run under the jacked-up wheel of a vehicle, the tire removed and lowered onto a transversely slidable portion of the trailer, such portion then being moved externally to move the tire away from the wheel whereafter the trailer may be moved out from under the vehicle wheel.

Other objects and advantages will appear from the following description taken in connection with the drawings, wherein:

FIG. 3 is a vertical sectional view taken along line 3—3 of FIG. 2.

Figure 1:
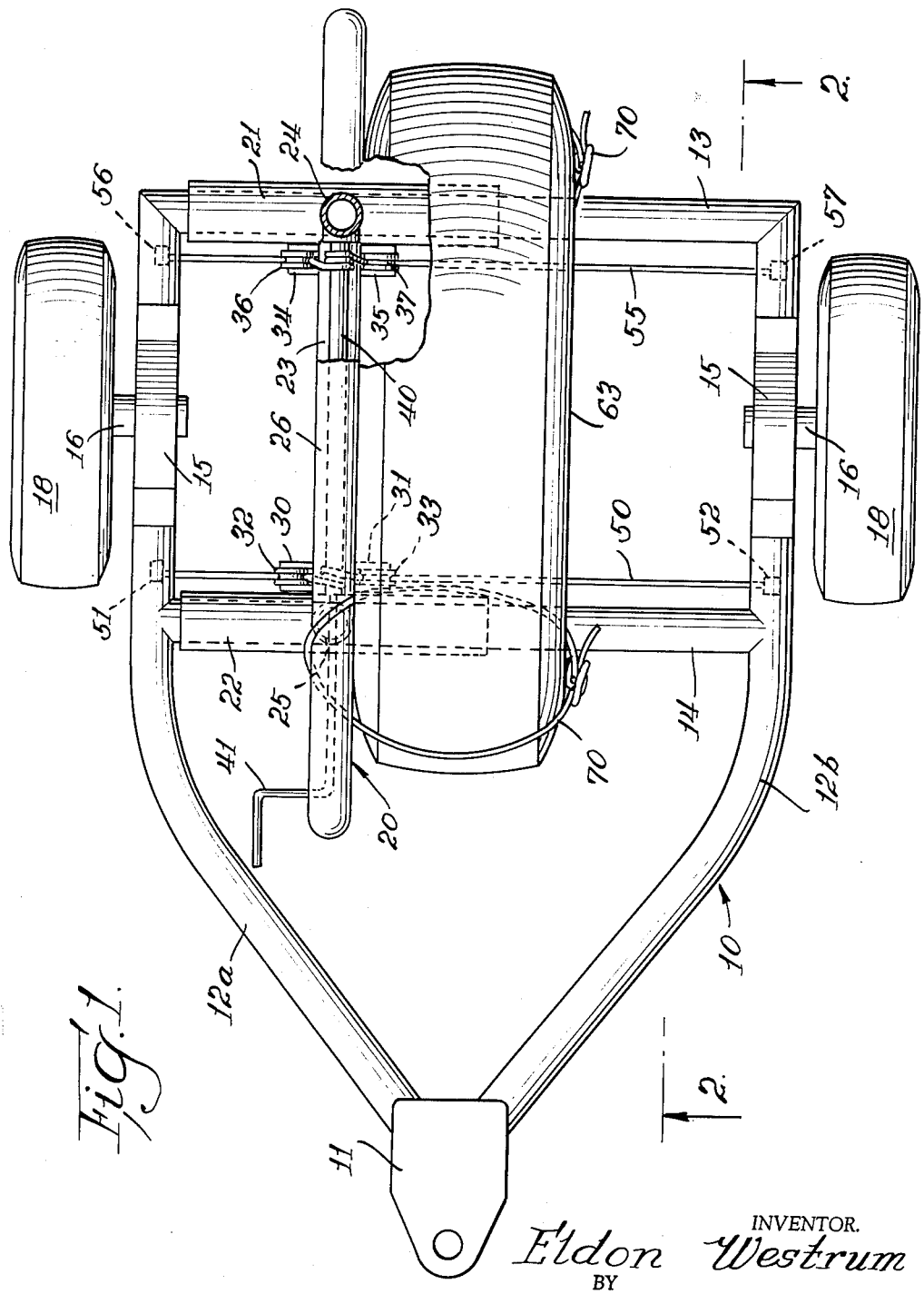
FIGURE 1 is a top plan view of a trolley constructed in accordance with the invention and showing a tire in position thereon.

The trailer of the present invention includes a main frame 10 which may be formed unitarily or may be formed from a plurality of members suitably connected together as by welding. The main frame includes a pair of hitch tongues 11 (one of which is shown), a pair of side members 12a, 12b having inclined portions extending from the hitch tongues 11 rearwardly and parallel portions rearwardly of the inclined portions. The frame also includes a rear transverse member 13 and an intermediate transverse member 14, both extending between the side members 12a and 12b. Supported by the side members 12a and 12b are bearings 15 in each of which an axle 16 is journaled, on which is carried a wheel 17 having a tire 18. The bearings 15 extend above the main frame 10 whereby the axles 16 are disposed above the main frame or bed 10 of the trailer. In other words, the trailer is a drop-bed trailer with the bed below the axles 16. It is of such height that it can be moved to a position under the jacked-up wheel of a tractor.

Supported on the main frame 10 for sliding movement transversely thereof is an auxiliary or load carrying frame 20. The auxiliary frame 20 includes a rear transverse member 21 of tubular form which is slidable on the rear transverse member 13 and a forward transverse member 22 of tubular form which is slidable on the intermediate transverse member 14. The tubular members 21 and 22 are connected by a central longitudinal member 23 which may also be of tubular form and attached to the members 21 and 22 as by welding. While the longitudinal member 23 is shown as the same size as the members 13 and 14, it will be understood that it can, if desired, be made of a different size and may be of the same diameter as the transverse members 21 and 22. Upstanding from the transverse members 21 and 22, preferably at the center portions thereof, are uprights 24 and 25 which may be tubular and which are secured to and support a generally upwardly concave or U-shaped member 26 which may be of tubular form and which extends longitudinally of the trailer.

A pair of brackets 30, 31 are secured to the longitudinal member 23 adjacent the transverse member 22 and pulleys 32, 33 are carried by said brackets, respectively. A similar pair of brackets 34, 35 are attached to the longitudinal member 23 adjacent the transverse member 21.

Figure 2:
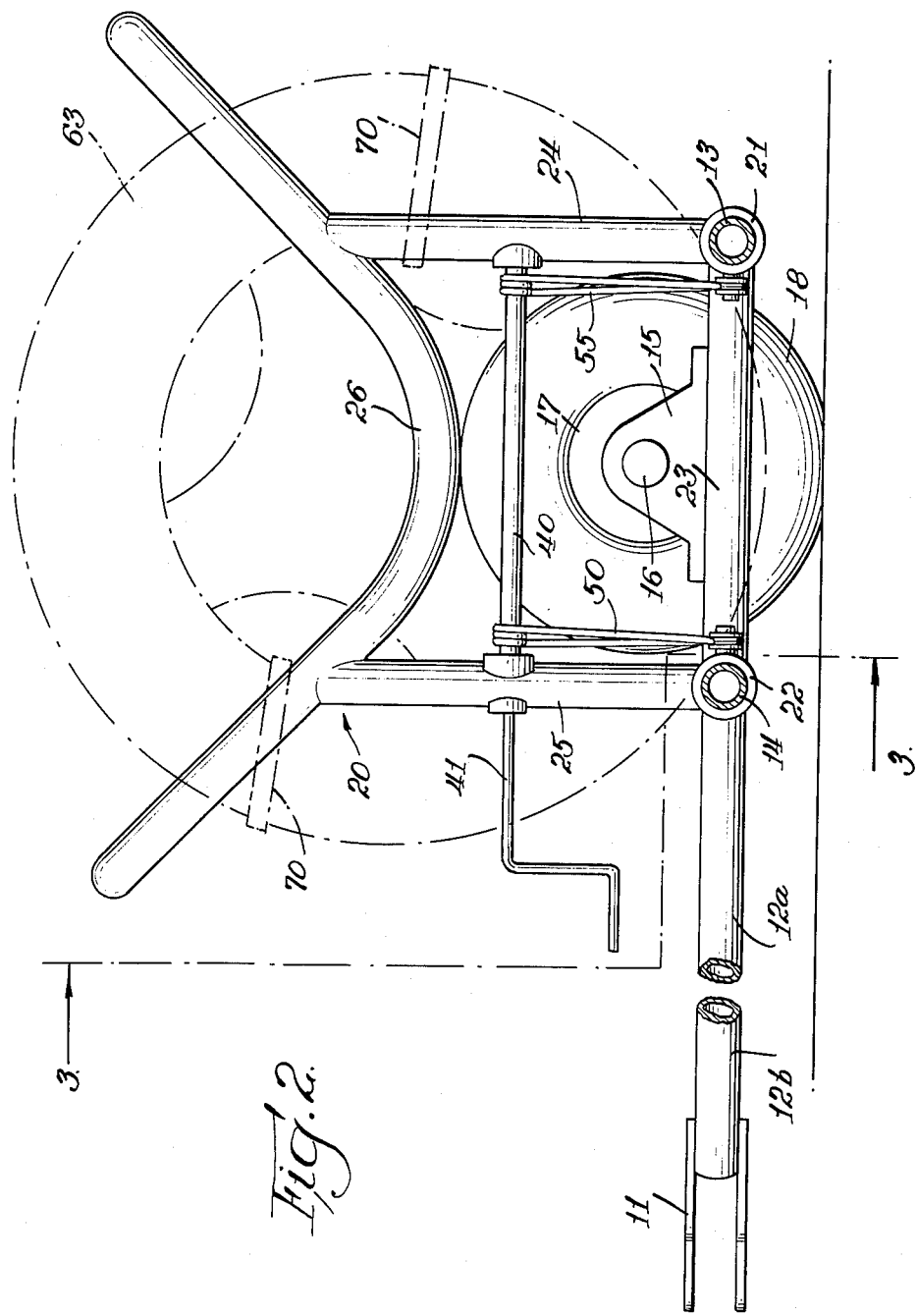
FIG. 2 is a vertical sectional view taken along line 2—2 of FIG. 1.

A windlass 40 is journaled in the upright members 24, 25 and has a handle 41 carried thereby and extending through the upright member 25 as seen particularly in FIG. 2 of the drawings. An elongate driving member 50, which preferably takes the form of cable but may be an equivalent member, is secured at one end to an anchor 51 carried by the side member 12a and trained under the pulley 32 and looped several times around the windlass 40 and then trained under the pulley 33 and attached at its other end to an anchor 52 connected to the side member 12b. A second elongate driving member similar to the driving member 50 is similarly arranged, that is to say, it is secured to an anchor member 56 connected to the side member 12a, trained under the pulley 36 and then wound several times around the windlass 40, then trained under the pulley 37 and connected at its other end to an anchor 57 secured to the side member 12b.

It will be seen from the foregoing that when the crank 41 is turned in one direction, it winds the driving members 50 and 55 in one direction onto the windlass 40 and unwinds them in the other direction. Since the ends of the driving members 50, 55 are secured to relatively fixed anchors on the main frame 10, the auxiliary frame is caused to slide on the main frame in an appropriate direction.

In the use of the trailer of the present invention, the axle 60 (FIG. 3) of a tractor is jacked up by means of a suitable jack 61 to raise the wheel 62 carrying the tire 63 whereby the tire 63 is raised off the ground to a height just above the height of the bed of the trailer. The trailer is then run under the vehicle whereby the tire 63 is disposed above the auxilary frame 20 and, more particularly, in a position above the transverse members 21, 22 of the frame 20, as seen particularly in FIG. 3.

The axle 60 is then lowered until the tire 63 rests upon the two corresponding side portions of the transverse members 21 and 22 whereupon the rim (not shown) is unbolted from the wheel 62 to permit the rim and tire to be removed from the wheel. Thereafter the handle 41 is operated to cause the auxiliary frame to move outwardly away from the vehicle and carry the tire in a horizontal direction far enough to clear the lug bolts on the tractor wheel. Thereafter the tire is secured to the U-shaped member 26 by a securing member 70, such as a strap, chain or rope, to prevent the tire from falling off the trailer.

The auxiliary frame 20 preferably is adjusted laterally to center the tire (and rim) on the trailer, as seen particularly in FIG. 1 of the drawings.

If desired, the trailer may be made of sufficient width so that it can be used to transport two tries, one on either side of the upright portion of the auxiliary frame 20. In that event, the main frame is made sufficiently wide to permit the approximate movement of the auxiliary frame in moving each tire sufficiently to disengage the lug bolts.

In will be understood that ordinarily the tractor tire will be of such weight as to render it difficult to raise and lower it manually but the tire can be removed from or assembled with a wheel by the use of a jack at the vehicle as explained. At the service station or repair shop a derrick or a chain fall can be used for raising or lowering the tire.

It will be understood that frictionless bearings (not shown), such as ball bearings, may be provided between the auxiliary frame and the main frame. Where such bearings are provided, they are preferably located in the transverse members 21 and 22 and receive the transverse members 13 and 14.

While the auxiliary frame is shown as a true frame, it will be understood that this term includes also an upright supporting member which functions in a generally similar manner but is not strictly a frame. For example, the auxiliary frame may include a single upright member extending upwardly from the horizontally disposed portions and a longitudinally extending member carried by the upright member; in other words, an upright structure in the general shape of a T.

I claim:
1. A load transporting trailer vehicle for carrying a relatively massive wheel and tire, or the like, comprising
   a main frame,
   a plurality of spaced apart wheels secured to opposite sides of said frame for supporting same,
   a transversely movable load supporting member carried by said main frame, said load supporting member including means for engaging bottom portions of the tire,
   means for securing at least a top portion of the tire to said load supporting member, and
   means for moving said load supporting member to distribute the load between said wheels,
   said moving means comprising
   a travelling winch mounted on said supporting member,
   an elongate, flexible member connected at its ends to said opposite sides of said frame and trained upon said winch intermediate its ends, and
   pulleys establishing a substantially parallel reationship of said flexible member and said supporting member below the path of travel of the bottom of the tire.
2. A vehicle as set forth in claim 1,
   said movable means being adapted to facilitate removal of the tire and associated wheel parts by providing sufficient transverse travel of said supporting member to free wheel parts from wheel securement parts.

References Cited by the Examiner

UNITED STATES PATENTS

| | | | |
|---|---|---|---|
| 1,374,986 | 4/21 | Carter | 214—330 |
| 1,830,740 | 11/31 | Leech et al. | 214—83.24 |
| 2,177,941 | 10/39 | Knudson et al. | 212—27 |
| 2,392,830 | 1/46 | Baum | 214—332 |
| 2,628,090 | 2/53 | Verdier | 74—95 X |
| 2,639,926 | 5/53 | Parks | 214—330 X |
| 2,647,648 | 8/53 | Ribarich | 214—331 |
| 2,910,201 | 10/59 | Finn | 214—330 |
| 3,003,780 | 10/61 | Lundahl | 214—505 X |
| 3,119,506 | 1/64 | Bridge et al. | 214—670 |

HUGO O. SCHULZ, *Primary Examiner.*